(12) United States Patent  
Fu

(10) Patent No.: US 8,383,256 B1  
(45) Date of Patent: Feb. 26, 2013

(54) MEMS SAFETY VALVE FOR BATTERIES

(75) Inventor: Yee-Chung Fu, Fremont, CA (US)

(73) Assignee: Advanced NuMicro Systems, Inc., San Jose, CA (US)

( * ) Notice: Subject to any disclaimer, the term of this patent is extended or adjusted under 35 U.S.C. 154(b) by 624 days.

(21) Appl. No.: 12/613,774

(22) Filed: Nov. 6, 2009

(51) Int. Cl.
*H01M 2/12* (2006.01)

(52) U.S. Cl. ............. 429/53; 429/82; 429/170; 429/163

(58) Field of Classification Search .................... 429/82, 429/53, 170, 163
See application file for complete search history.

(56) References Cited

U.S. PATENT DOCUMENTS 6,730,430 B2   5/2004   Chang

OTHER PUBLICATIONS

A. Debray et al., "A Micro-Machined Safety Valve for Power Applications with Optimized Low Leakage," The Fifth International Workshop on Micro and Nanotechnology for Power Generation and Energy Conversion Applications, PowerMEMS 2005, Nov. 28-30, 2005, Takeda Hall, the University of Tokyo, Japan, pp. 198-201.

*Primary Examiner* — Jane Rhee

(74) *Attorney, Agent, or Firm* — Patent Law Group LLP; David C. Hsia

(57) ABSTRACT

A battery has a battery case with a hole, and a micro-electro-mechanical system (MEMS) safety valve mounted to the battery case over the hole. The MEMS safety valve includes a silicon diaphragm and a silicon electrode layer with a movable electrode mounted above the diaphragm, a stationary electrode around the movable electrode, and one or more links electrically connecting the movable and the stationary electrodes. The stationary electrode, the links, and the movable electrode form part of an electrical path between one or more battery cells and a battery terminal. The links break to open the electrical path when the pressure in the battery case pushes the diaphragm and the links past a first limit. The diaphragm breaks to release fluid from the battery case when the pressure pushes the diaphragm past a second limit. The first limit may be smaller, larger, or the same as the second limit.

10 Claims, 7 Drawing Sheets

MEMS SAFETY VALVE FOR BATTERIES

FIELD OF INVENTION

This invention relates a safety valve for batteries, and more particular to a micro-electro-mechanical system (MEMS) safety valve for batteries.

DESCRIPTION OF RELATED ART

Lithium batteries can provide extremely high currents and can discharge very rapidly when short-circuited. Although this is useful in applications where high currents are required, a too-rapid discharge of a lithium battery can result in overheating of the battery, rupture, and even explosion.

SUMMARY

In one or more embodiments of the present disclosure, a battery has a battery case with a hole, and a micro-electro-mechanical system (MEMS) safety valve mounted to the battery case over the hole. The MEMS safety valve includes a silicon diaphragm and a silicon electrode layer with a movable electrode mounted above the diaphragm, a stationary electrode around the movable electrode, and one or more links connecting the movable and the stationary electrodes. The stationary electrode, the links, and the movable electrode form part of an electrical path between one or more battery cells and a battery terminal. The links break to open the electrical path when the pressure in the battery case pushes the diaphragm and the links past a first limit. The diaphragm breaks to release fluid (gas or liquid) from the battery case when the pressure pushes the diaphragm past a second limit. The first limit may be smaller, larger, or the same as the second limit.

BRIEF DESCRIPTION OF THE DRAWINGS

In the drawings.

Use of the same reference numbers in different figures indicates similar or identical elements.

DETAILED DESCRIPTION OF THE INVENTION

Figure 1:
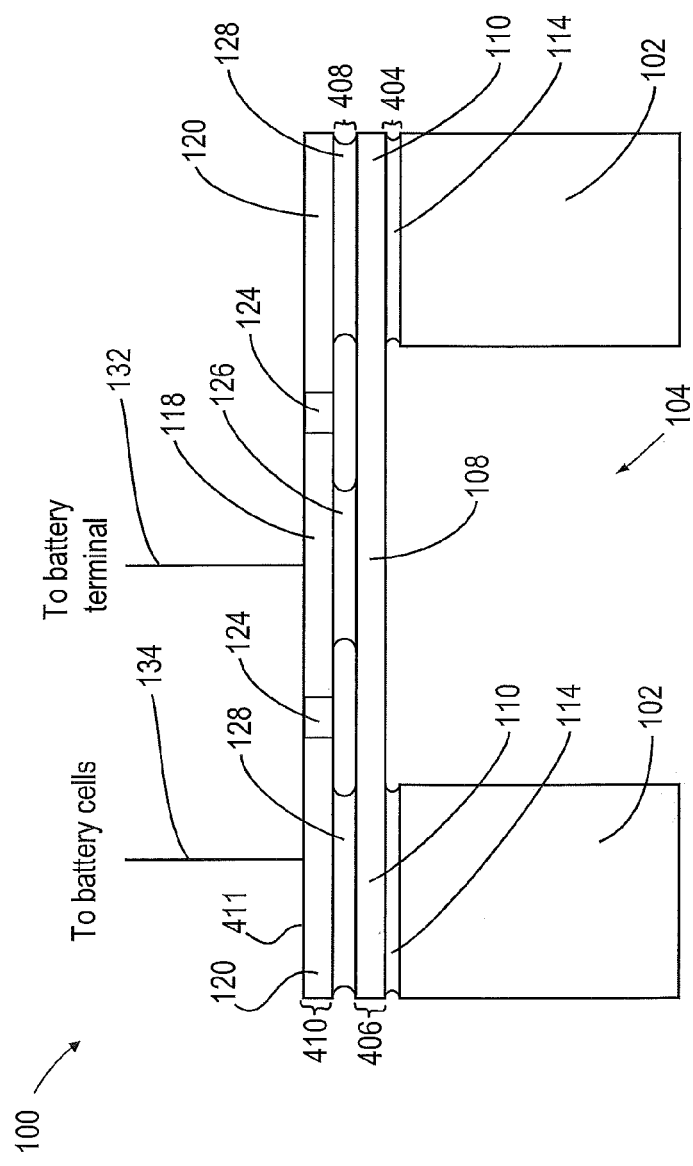
FIG. 1 illustrates a cross sectional view of a MEMS safety valve in one or more embodiments of the present disclosure.
Figure 2:
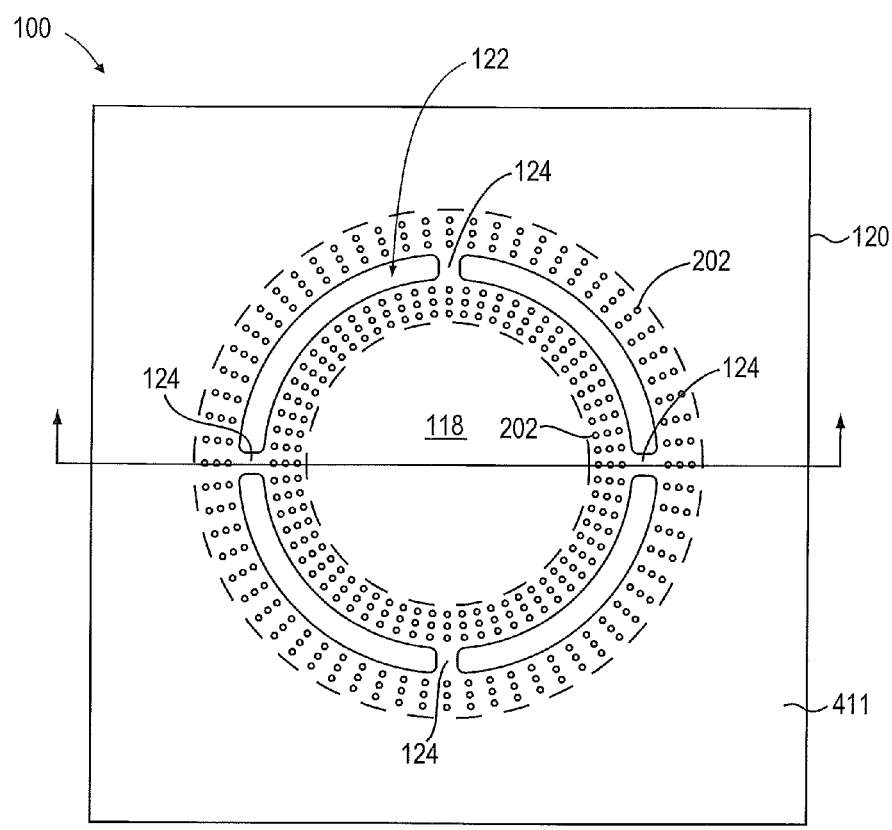
FIG. 2 illustrates a top view of the MEMS safety valve of FIG. 1 in one or more embodiments of the present disclosure.

FIGS. 1 and 2 illustrate a micro-electro-mechanical system (MEMS) safety valve 100 for batteries in one or more embodiments of present disclosure. Safety valve 100 is formed using conventional semiconductor manufacturing processes.

Referring to FIG. 1, safety valve 100 includes a silicon spacer 102 that defines an opening 104. A silicon membrane layer 406 is mounted above spacer 102. An inner portion of membrane layer 406 exposed by opening 104 forms a diaphragm 108 and a peripheral portion mounted above spacer 102 forms a stationary perimeter 110 around the diaphragm. In one or more embodiments of the present disclosure, opening 104 is a round opening and diaphragm 108 is therefore round.

A first oxide layer 404 has a portion 114 between spacer 102 and stationary perimeter 110. As will be describe later, oxide layer 404 acts as an etch stop in the process for making opening 104 in spacer 102.

A silicon electrode layer 410 is mounted above silicon membrane layer 406. Silicon electrode layer 410 includes a movable electrode 118, a stationary electrode 120 around the movable electrode, and one or more links 124 that electrically connect the movable and the stationary electrodes. Movable electrode 118, links 124, and stationary electrode 120 may be covered by metal 411 following their shapes. Metal 411 may be gold, aluminum, or other similar conductors. Movable electrode 118 is located substantially above diaphragm 108 while stationary electrode 120 is located substantially above stationary perimeter 110. Movable electrode 118 or metal 411 thereon is coupled by a conductor 132 to a battery terminal while stationary electrode 120 or metal 411 thereon is coupled by a conductor 134 to one or more battery cell, or vice versa.

A second oxide layer 408 has an inner portion 126 between movable electrode 118 and diaphragm 108, and a peripheral portion 128 between stationary electrode 120 and stationary perimeter 110. Oxide layer 408 acts as an insulating layer to prevent electrodes 118 and 120 from being shorted.

Referring to FIG. 2, movable electrode 118 has a disk shape and stationary electrode 120 has a round inner perimeter that matches the shape of the movable electrode. Movable electrode 118 and stationary electrode 120 are separated by a gap 122 between their perimeters, and the movable and the stationary electrodes are electrically connected by links 124. Metal 411 follow the shapes of movable electrode 118, links 124, and stationary electrode 120. As will be described later, links 124 and any metal 441 thereon serve as a fuse that breaks when the pressure within a battery case is too high to prevent electrical damage to any devices connected to the battery.

As a result of oxide etch and release of movable electrode 118 and stationary electrode 120 from oxide layer 408, holes 202 (only two are labeled for clarity) are formed on the outer circumference of movable electrode 118 and the inner circumference of stationary electrode 120. Note that the phantom lines shown indicate the perimeter of oxide portions 126 and 128 from oxide layer 408 (FIG. 1).

Figure 3:
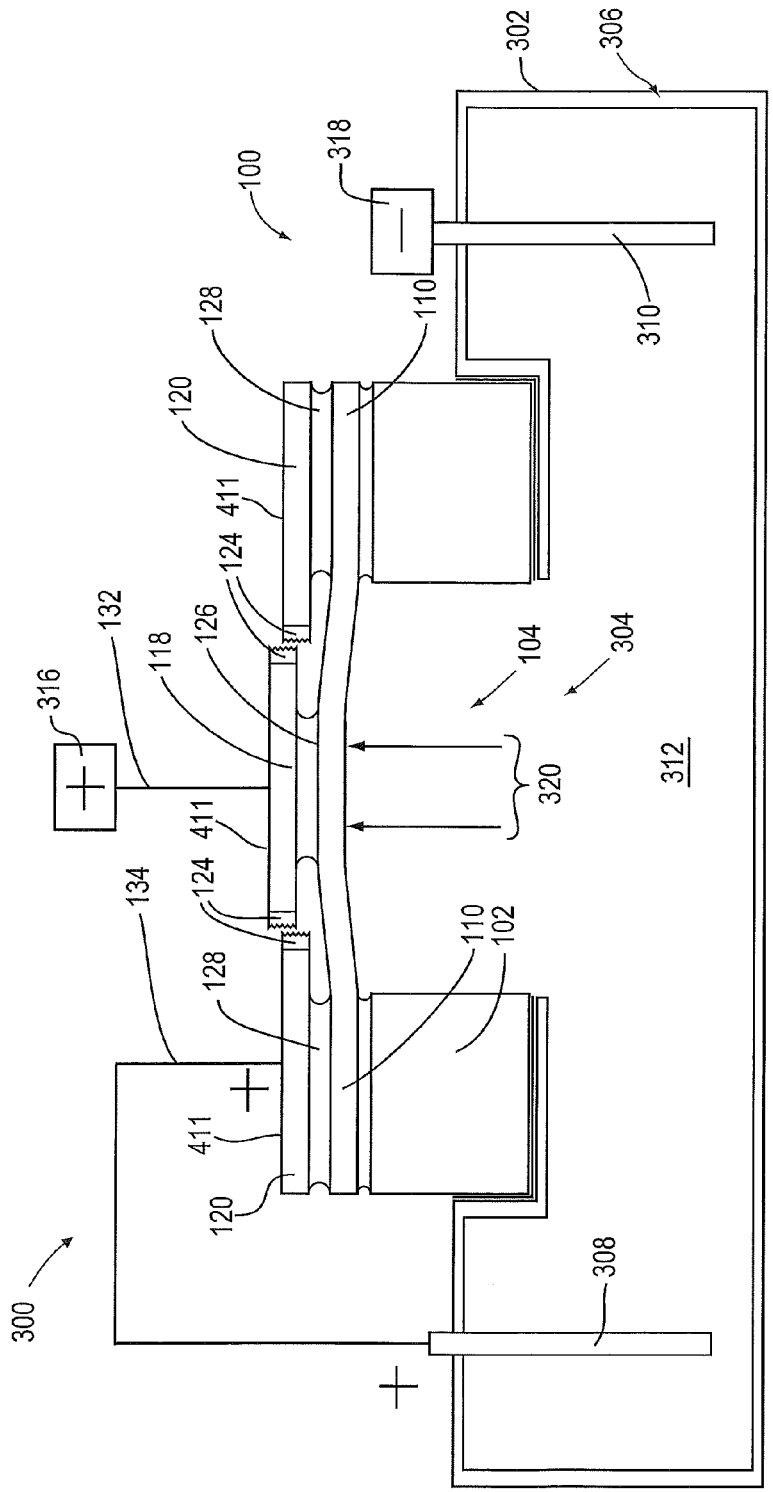
FIG. 3 illustrates a cross sectional view of a battery with the MEMS safety valve of FIGS. 1 and 2 in one or more embodiments of the present disclosure.

FIG. 3 shows a battery 300 with MEMS safety valve 100 mounted to a battery case 302 in one or more embodiments of the present disclosure. Battery case 302 has a hole 304, and MEM safety valve 100 is mounted over the hole. Safety valve 100 may be glued, bonded, or otherwise fixed to battery case 302. One or more battery cells 306 are located in battery case 302. Each battery cell 306 includes an anode 308 and a cathode 310 in an electrolyte 312. Battery cells 306 may be coupled in series, in parallel, or a combination of both. For clarity, only one battery cell 306 is illustrated. Anode 308 of battery cell 306 is electrically coupled by conductor 134 to stationary electrode 120 or metal 411 thereon, which is electrically connected by links 124 or metal 411 thereon to movable electrode 118 or metal 411 thereon, which is in turn electrically coupled by conductor 132 to a positive battery terminal 316. Thus, stationary electrode 120, links 124, and movable electrode 118 form part of an electrical path between battery cell 306 and battery terminal 316. Metal 411 on stationary electrode 120, links 124, and movable electrode 118 also forms part of the electrical path between battery cell 306 and battery terminal 316. Cathode 310 of battery cell 306 is electrically coupled to a negative battery terminal 318. Alternatively the connections may be reversed.

When pressure 320 builds up in battery case 302, it pushes diaphragm 108 and movable electrode 118 upward. When diaphragm 108 and movable electrode 118 move beyond a first limit, links 124 and any metal 411 thereon would break and the electric path from battery cell 306 to positive battery terminal 316 would open to prevent damage to any device connected to the battery. When pressure 320 continues to build and push diaphragm 108 beyond a second limit, the diaphragm would break and the fluid (gas or liquid) in battery case 302 would be allowed to escape to prevent the battery from exploding and causing personal injury. By design, the first limit may be smaller, larger, or the same as the second limit.

FIGS. 4A, 4B, 4C, 4D and 3 illustrate a method to make battery 300 by fabricating MEMS safety valve 100 using convention semiconductor manufacturing processes and then mounting the MEMS safety valve to battery case 302 in one embodiment of the invention. In the first step illustrated in FIG. 4A, a double silicon-on-insulator substrate 400 is provided. Substrate 400 includes a first silicon layer 402, a first oxide layer 404 above silicon layer 402, a second silicon layer 406 above oxide layer 404, a second oxide layer 408 above silicon layer 406, and a third silicon layer 410 above oxide layer 408. A layer of metal 411 may be deposited over third silicon layer 410. As used here, a silicon layer refers to any material with silicon, including single crystal silicon, polysilicon, and silicon carbide. Silicon layers 406 and 410 can be selected to be stiff or soft depending on the sensitivity to pressure desired for MEMS safety valve 100.

Figure 4A:
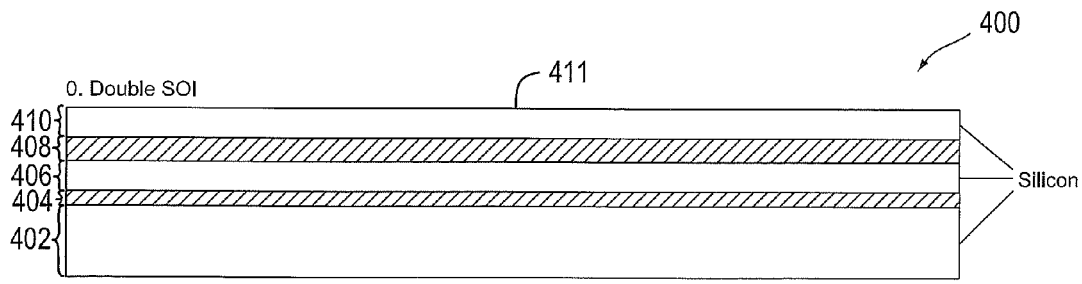
FIGS. 4A, 4B, 4C, and 4D illustrate a process for making the battery with the MEMS safety valve of FIG. 3 in one or more embodiments of the present disclosure.
Figure 4B:
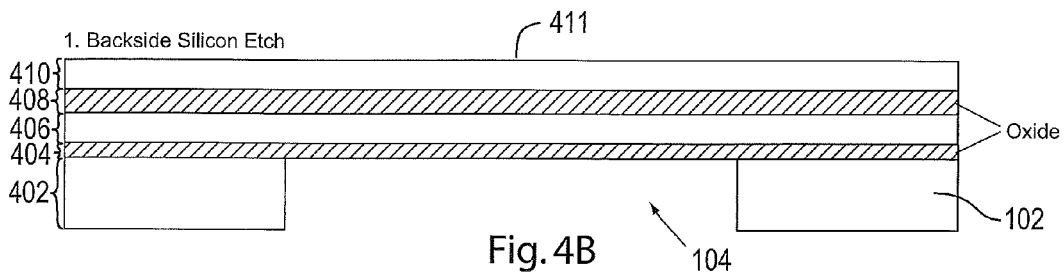

In the second step illustrated in FIG. 4B, silicon layer 402 is etched down to oxide layer 404 to form spacer 102 with opening 104. In this step, oxide layer 404 acts as an etch stop.

Figure 4C:
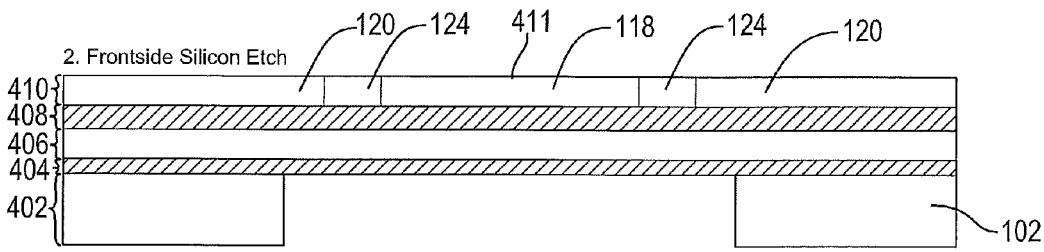

In the third step illustrated in FIG. 4C, silicon layer 410 and metal layer 411 are etched to form movable electrode 118, stationary electrode 120, and links 124 electrically connecting the movable and the stationary electrodes. Also in this step, holes 202 (FIG. 2) are etched in the outer perimeter of movable electrode 118 and the inner perimeter of stationary electrode 120 in preparation for the oxide etch and release in the next step.

Figure 4D:
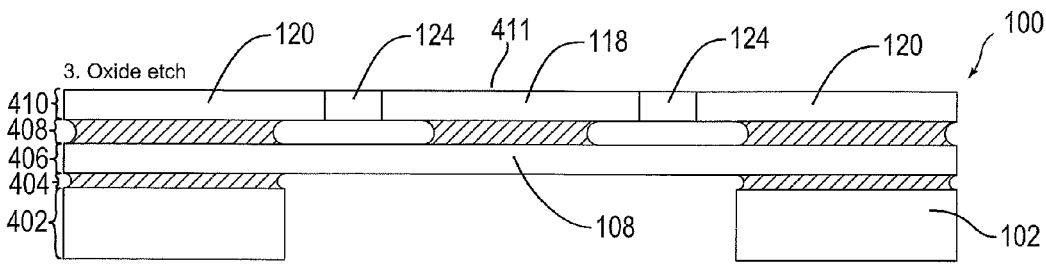

In the fourth step illustrated in FIG. 4D, an oxide etch is performed to remove portions of oxide layers 404 and 408 exposed by silicon layer, 402 silicon layer 410, and metal layer 411. Specifically, this releases movable electrode 118 and diaphragm 108 from the remainder of the structure so they can translate vertically under pressure.

In the fifth step illustrated in FIG. 3, anode 308 of battery cell 306 is electrically coupled by conductor 134 to stationary electrode 120, and movable electrode 118 is coupled by conductor 132 to positive battery terminal 316. MEMS safety valve 100 is then mounted to battery case 302 over hole 304 to complete battery 300

Figure 5:
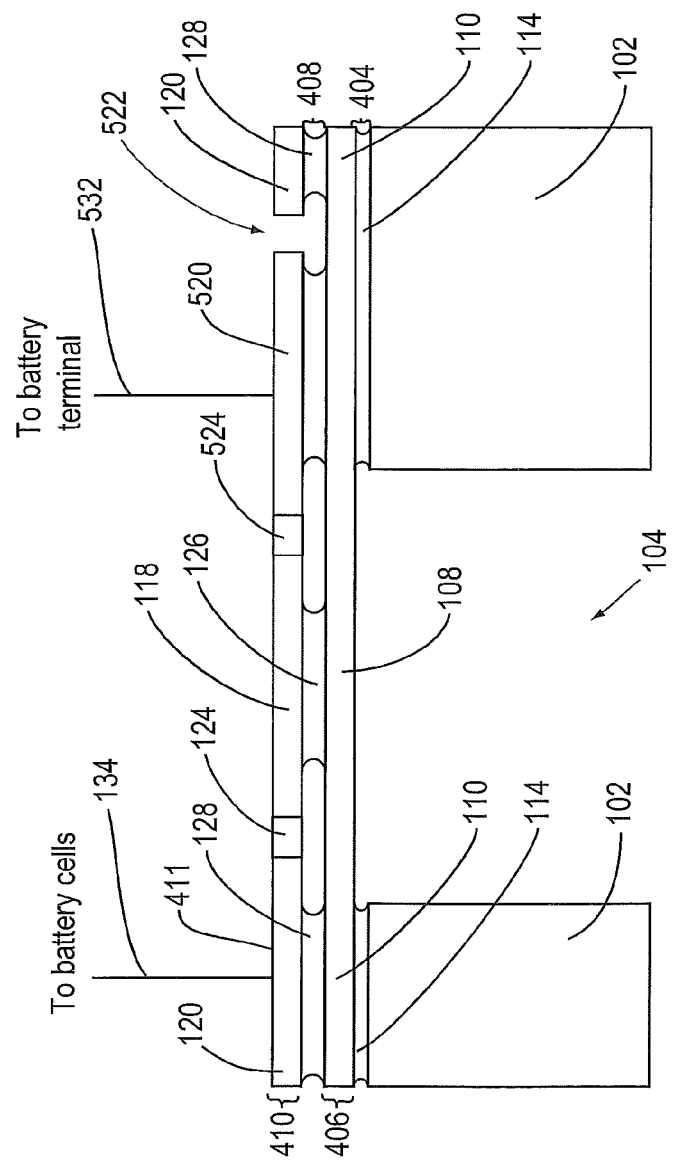
FIG. 5 illustrates a cross sectional view of another MEMS safety valve in one or more embodiments of the present disclosure.
Figure 6:
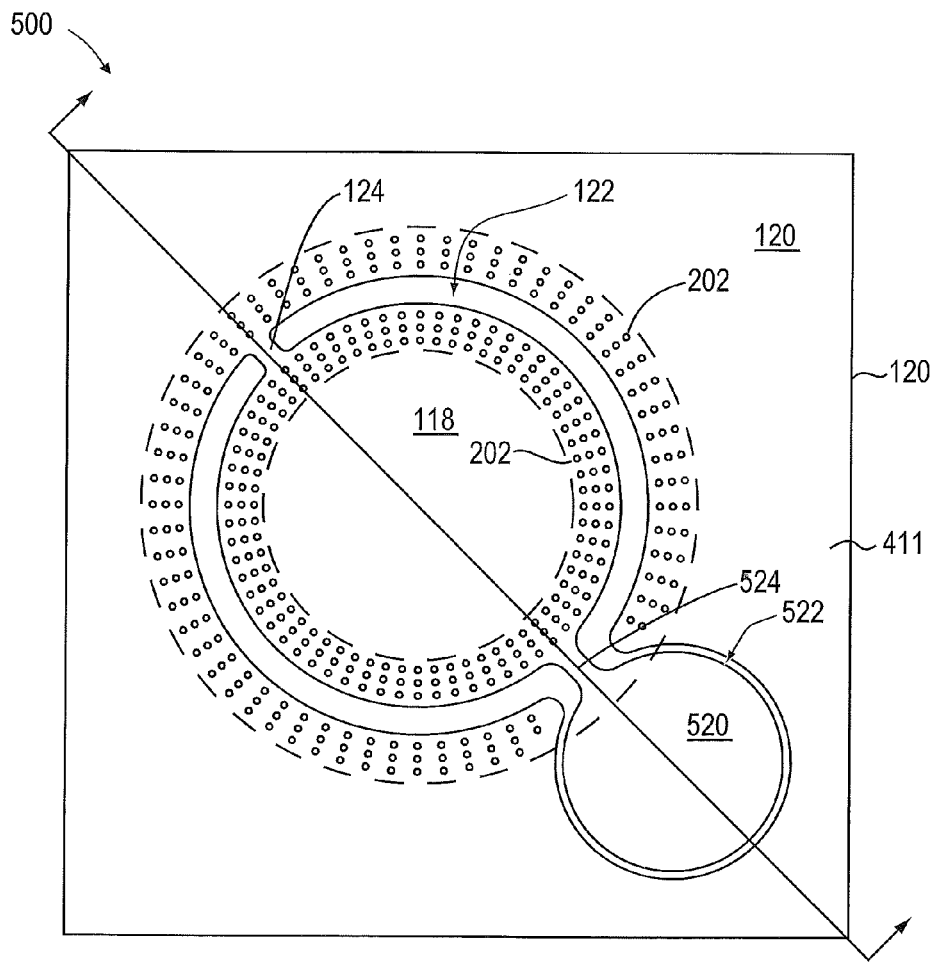
FIG. 6 illustrates a top view of the MEME safety valve of FIG. 5 in one or more embodiments of the present disclosure.

FIGS. 5 and 6 illustrate a MEMS safety valve 500 in one or more embodiments of the present disclosure. MEMS safety valve 500 is similar to MEMS safety valve 100 except that silicon electrode layer 410 now includes an additional stationary electrode 520 located substantially above stationary perimeter 110. Stationary electrodes 120 and 520 are separated by a gap 522. Stationary electrode 520 is electrically connected to movable electrode 118 by one or more links 524. Stationary electrode 120, links 124, movable electrode 118, links 524, and stationary electrode 520 may be covered by metal 411 following their shapes. Stationary electrode 520 or metal 411 thereon is electrically coupled to a battery terminal by conductor 532. MEMS safety valve 500 may be made in a similar manner as MEMS safety valve 100 except silicon electrode layer 410 is further etched to form movable electrode 520 and links 524.

Figure 7:
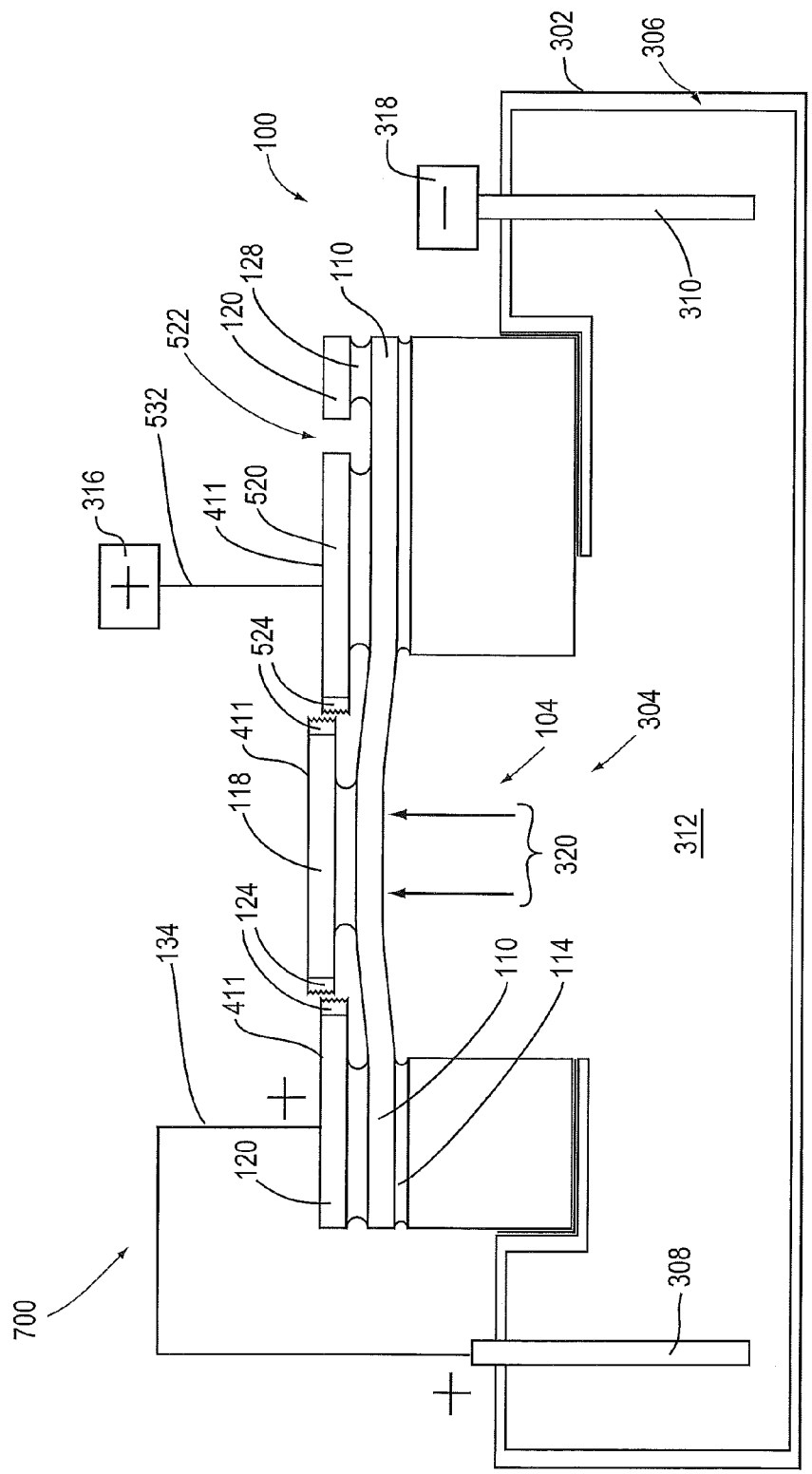
FIG. 7 illustrates a cross sectional view of a battery with the MEMS safety valve of FIGS. 5 and 6 in one or more embodiments of the present disclosure.

FIG. 7 shows a battery 700 with safety valve 500 mounted to battery case 302 in one or more embodiments of the present disclosure. Safety valve 100 is mounted over hole 304 of battery case 302. Safety valve 500 may be glued, bonded, or otherwise fixed to battery case 302. Anode 308 of battery cells 306 is electrically coupled by conductor 134 to stationary electrode 120 or metal 411 thereon, which is electrically connected by links 124 or metal 411 thereon to movable electrode 118 or metal 411 thereon. Movable electrode 118 or metal 411 thereon is electrically connected by links 524 or metal 411 thereon to stationary electrode 520 or metal 411 thereon, which is in turn electrically coupled by conductor 532 to positive battery terminal 316. Thus, stationary electrode 120, links 124, movable electrode 118, links 524, and stationary electrode 520 form part of an electrical path between battery cell 306 and battery terminal 316. Metal 411 on stationary electrode 120, links 124, movable electrode 118, links 524, and stationary electrode 520 also forms part the electrical path between battery cell 306 and battery terminal 316. As stationary electrode 520 does not move, it may be easier to electrically couple the stationary electrode to battery terminal 316. Cathode 310 of battery cells 306 is coupled to a negative battery terminal 318. Alternatively the connections may be reversed.

When pressure 320 builds up in battery case 302, it pushes diaphragm 108 and movable electrode 118 upward. When diaphragm 108 and movable electrode 118 move beyond a first limit, links 124, links 524, and any metal 411 thereon would break and the electric path from battery cell 306 to positive battery terminal 316 would open to prevent damage to any device connected to the battery. When pressure 320 continues to build and push diaphragm 108 beyond a second limit, the diaphragm would break and the fluid (gas or liquid) in battery case 302 would be allowed to escape to prevent the battery from exploding and causing personal injury. By design, the first limit may be smaller, larger, or the same as the second limit.

Various other adaptations and combinations of features of the embodiments disclosed are within the scope of the invention. Instead of using single or double SOI substrates to form the sensors, multiple silicon substrate can be bonded together to form the sensors where the oxide layer is grown or deposited on the substrates. Furthermore, although the movable electrode is described as being enclosed by the stationary electrode, the design can be modified where the movable electrode encloses the stationary electrode. Numerous embodiments are encompassed by the following claims.

The invention claimed is:
1. A battery, comprising:
   a battery case having a hole;
   a battery cell in the battery case, the battery cell comprising an anode and a cathode in an electrolyte;
   a battery terminal;

a micro-electro-mechanical system (MEMS) safety valve mounted to the battery case over the hole, the MEMS safety valve comprising:

a silicon spacer defining an opening;

a silicon membrane layer forming a diaphragm opposite the opening and a stationary perimeter mounted above the silicon spacer; and a silicon electrode layer comprising a movable electrode mounted above the diaphragm, a stationary electrode mounted above the stationary perimeter, and one or more links connecting the movable and the stationary electrodes; and wherein the stationary electrode, the links, and the movable electrode form part of an electrical path between the battery cell and the battery terminal, the links break to open the electrical path between the battery cell and the battery terminal when the pressure in the battery case pushes the diaphragm and the links past a first limit, and the diaphragm breaks to release fluid from the battery case when the pressure in the battery case pushes the diaphragm past a second limit.

2. The battery of claim 1, wherein the MEMS safety valve further comprises a metal layer over the stationary electrode, the links, and the movable electrode, the metal layer forming part of the electrical path between the battery cell and the battery terminal.

3. The battery of claim 1, further comprising:

a first oxide layer between the stationary perimeter and the spacer; and a second oxide layer comprising a first portion between the movable electrode and the diaphragm, and a second portion between the stationary electrode and stationary perimeter.

4. The battery of claim 1, wherein the stationary electrode is electrically coupled to one of the anode and the cathode, and the movable electrode is electrically coupled to the battery terminal.

5. The battery of claim 4, further comprising an other battery terminal electrically coupled to the other of the anode and the cathode.

6. The battery of claim 1, wherein the silicon electrode layer further comprises an other stationary electrode mounted above the stationary perimeter, and one or more other links connecting the movable electrode and the other stationary electrode.

7. The battery of claim 6, wherein the MEMS safety valve further comprises a metal layer over the stationary electrode, the links, the movable electrode, the other links, and the other stationary electrode, the metal layer forming part of the electrical path between the battery cell and the battery terminal.

8. The battery of claim 6, wherein the stationary electrode is electrically coupled to the anode or the cathode, and the other stationary electrode is electrically coupled to the battery terminal.

9. The battery of claim 7, further comprising an other battery terminal electrically coupled to the other of the anode and the cathode.

10. The battery of claim 1, wherein the silicon membrane layer is selected from the group consisting of single crystal silicon, polysilicon, and silicon carbide.

* * * * *